United States Patent
Albertson et al.

(10) Patent No.: US 9,423,019 B2
(45) Date of Patent: Aug. 23, 2016

(54) MANUAL PARK RELEASE ACTUATOR ASSEMBLY

(71) Applicant: GM GLOBAL TECHNOLOGY OPERATIONS LLC, Detroit, MI (US)

(72) Inventors: Todd D. Albertson, Macomb Township, MI (US); Ronald C. Gott, Riley, MI (US); Douglas W. Schumann, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 184 days.

(21) Appl. No.: 14/173,184

(22) Filed: Feb. 5, 2014

(65) Prior Publication Data

US 2015/0219208 A1 Aug. 6, 2015

(51) Int. Cl.
*F16H 63/34* (2006.01)
*F16H 59/10* (2006.01)
*F16H 61/22* (2006.01)

(52) U.S. Cl.
CPC ............... *F16H 59/10* (2013.01); *F16H 61/22* (2013.01); *F16H 63/3491* (2013.01); *Y10T 74/20098* (2015.01)

(58) Field of Classification Search
CPC .......................... F16C 1/105; F16H 63/3491
USPC ................ 192/219.4, 220.2; 70/245
See application file for complete search history.

(56) References Cited

U.S. PATENT DOCUMENTS

| | | | | |
|---|---|---|---|---|
| 3,879,866 A | * | 4/1975 | Gunderson | E01H 5/045 193/22 |
| 6,619,459 B2 | * | 9/2003 | Gudlin | B60T 7/107 188/156 |
| 2009/0151501 A1 | | 6/2009 | Jung et al. | |

FOREIGN PATENT DOCUMENTS

DE 10045953 A1 5/2002
DE 102014115430 A1 4/2015

OTHER PUBLICATIONS

Waytek Wire, Mini Splash Proof Connectors, Oct. 27, 2010, Stock No. 38684.*

* cited by examiner

*Primary Examiner* — William Kelleher
*Assistant Examiner* — Randell J Krug
(74) *Attorney, Agent, or Firm* — Quinn Law Goup, PLLC

(57) ABSTRACT

A manual park release assembly includes a housing defining an inner cavity and an opening in communication with the inner cavity. The manual park release assembly further includes a locking device at least partially disposed in the inner cavity. The locking device is movable relative to the housing between a locked position and an unlocked position. Further, the manual park release actuator assembly includes a manual park release actuator coupled to the locking device. The manual park release actuator is movable relative to the housing between a first position and a second position when the locking device is in the unlocked position. The manual park release actuator includes an actuator body sized to be at least partially received in the opening and a plurality of mechanical stops coupled to the actuator body.

20 Claims, 11 Drawing Sheets

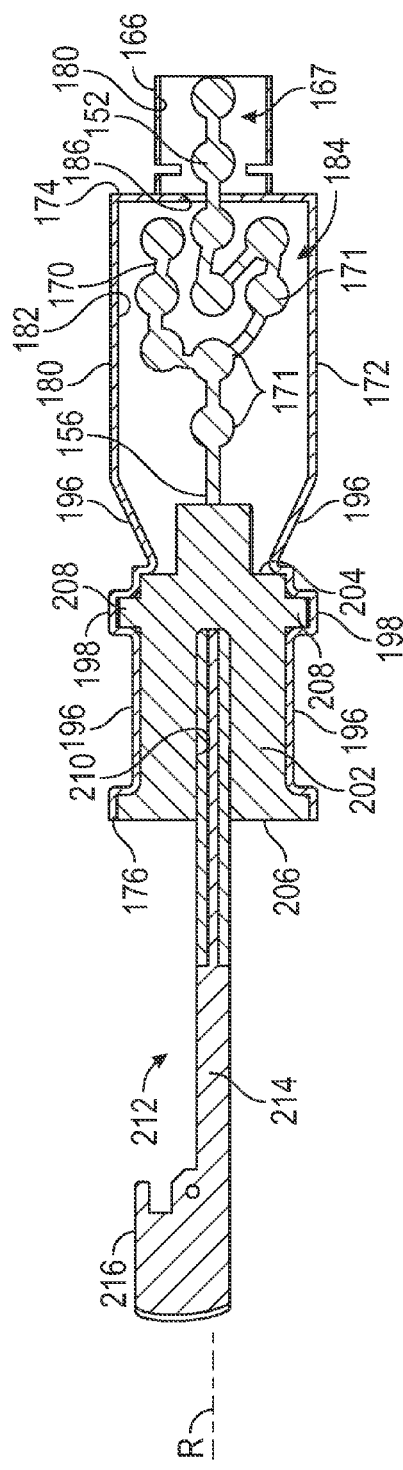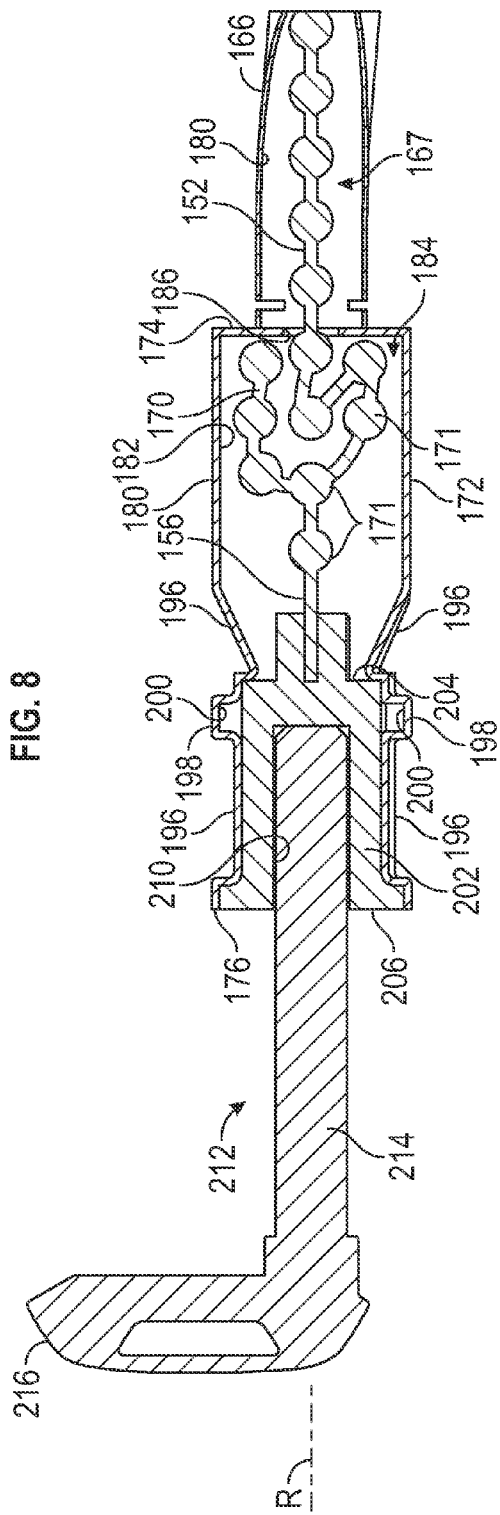

MANUAL PARK RELEASE ACTUATOR ASSEMBLY

TECHNICAL FIELD

The present disclosure relates to a manual park release assembly for shifting an automatic transmission from a Park mode to an Out-of-Park mode.

BACKGROUND

Motor vehicles include a power plant (e.g., engine or electric motor) capable of producing driving power and a transmission for transferring the driving power to a driveline for driving a set of wheels at selected gear ratios. Automatic transmissions shift automatically to the appropriate gear ratio based on various vehicle operating conditions including speed and torque. Typically, a desired transmission operating mode is selected by the vehicle operator. The modes provided by most automatic transmissions generally include Park, Neutral, Reverse and Drive. In Drive, the automatic transmission automatically shifts between three or more different forward gear ratios based on the vehicle operating conditions. In this disclosure, the automatic transmission is considered to be operating in an Out-of-Park mode when it is operating in any mode other than Park (e.g., Neutral, Reverse and Drive modes). It is useful to shift the automatic transmission from the Park mode to the Out-of-Park mode without the need to start the engine or supplying electrical power to the vehicle. To do so, the vehicle may include a manual park release actuator for manually shifting the automatic transmission from the Park mode to an Out-of-Park mode. As used herein, the term "manual park release actuator" refers to an actuator that can be manually manipulated in order to shift the automatic transmission from the Park mode to the Out-of-Park mode. The manual park release actuator may be moved from a first position to a second position relative to a vehicle body in order to shift the automatic transmission from the Park mode to the Out-of-Park mode. It is useful to fix the manual park release actuator in its second position relative to the vehicle body in order to maintain the automatic transmission in the Out-of-Park mode.

SUMMARY

The present disclosure relates to a manual park release assembly capable of fixing a manual park release actuator relative to the vehicle body once the automatic transmission is in the Out-of-Park mode. In an embodiment, the manual park release assembly includes a housing defining an inner cavity and an opening in communication with the inner cavity. The manual park release assembly further includes a locking device at least partially disposed in the inner cavity. The locking device is movable relative to the housing between a locked position and an unlocked position. Further, the manual park release actuator assembly includes a manual park release actuator coupled to the locking device. The manual park release actuator is movable relative to the housing between a first position and a second position when the locking device is in the unlocked position. The manual park release actuator includes an actuator body sized to be at least partially received in the opening and a plurality of mechanical stops coupled to the actuator body. At least one of the mechanical stops is disposed outside the housing when the actuator body is at least partially disposed in the opening. The manual park release actuator is operatively coupled to the transmission such that moving the manual park release actuator relative to the housing from the first position to the second position causes the transmission to shift from the Park mode to the Out-of-Park mode.

The present disclosure also relates to vehicles, such as cars and trucks. In an embodiment, the vehicle includes a vehicle body and a transmission operatively coupled within the vehicle body. The transmission has a Park mode and an Out-of-Park mode. The vehicle further includes a housing coupled to the vehicle body. The housing defines an inner cavity and an opening in communication with the inner cavity. The vehicle further includes a manual park release actuator at least partially disposed in the inner cavity. The manual park release actuator is movable relative to the housing between a first position and a second position. Moreover, the manual park release actuator is operatively coupled to the transmission such that moving the manual park release actuator relative to the housing from the first position to the second position causes the transmission to shift from the Park mode to the Out-of-Park mode. The manual park release actuator includes an actuator body sized to be at least partially received in the opening. The manual park release actuator further includes a plurality of mechanical stops coupled to the actuator body. At least one of the mechanical stops is disposed outside the housing when the actuator body is at least partially disposed in the opening.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a schematic, cross-sectional side of the manual park release assembly, showing a manual park release actuator in a first position, and the locking device is in a locked position;

FIG. 9 is schematic, cross-sectional view of the manual park release assembly, showing the manual park release actuator in the first position, and the locking device in an unlocked position;

DETAILED DESCRIPTION

Figure 1:
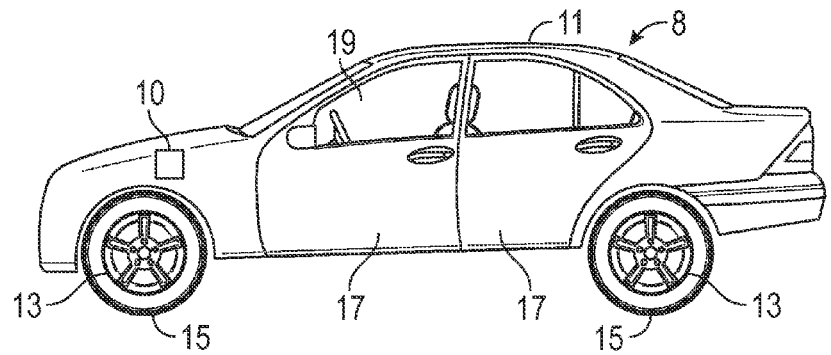
FIG. 1 is a schematic side view of a vehicle.

Referring to the figures wherein like reference numbers represent like characters, FIG. 1 schematically illustrates a vehicle 8 including a vehicle body 11 and wheels 13 operatively coupled to the vehicle body 11. Each wheel 13 is operatively coupled to a tire 15. The tires 15 are therefore operatively coupled to the vehicle body 11 through the wheels 13. The vehicle body 11 defines a passenger compartment 19 and includes doors 17 to provide access to the passenger compartment 19. Further, the vehicle body 11 includes hinge pillars 162 (FIG. 5), and each door 17 is movably coupled to a hinge pillar 162. Specifically, each door 17 can move (e.g., pivot) relative to the hinge pillar 162 between a closed position (FIG. 1) and an open position (not shown). As a non-limiting example, each door 17 can be pivotally coupled to the hinge pillar 162 (FIG. 5) with hinges. Accordingly, each door 17 can pivot relative to the hinge pillar 162 (FIG. 5) between the closed and open positions. When the door 17 is in the open position, vehicle passengers can enter the passenger compartment 19. In addition to the doors 17, the vehicle 8 includes a powertrain 10 for propelling the vehicle 8.

Figure 2:
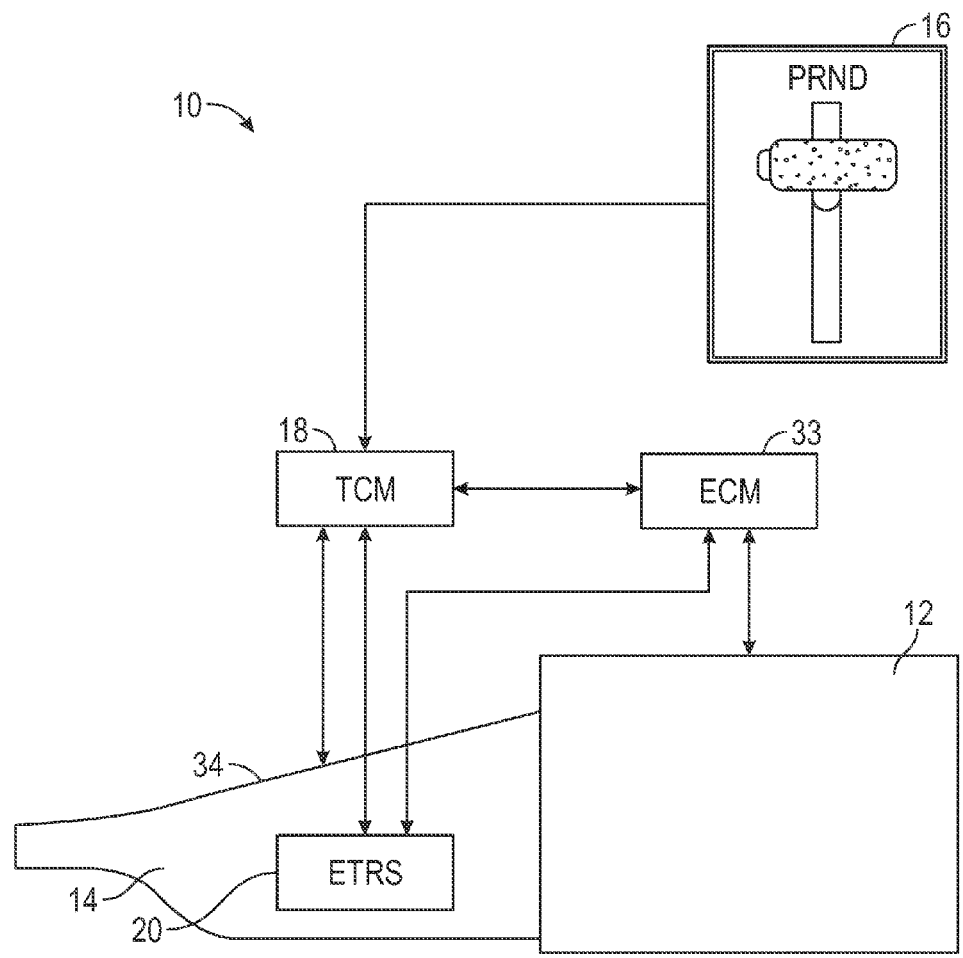
FIG. 2 is a schematic diagrammatic illustration of a partial powertrain of the vehicle shown in FIG. 1, wherein the powertrain has a transmission including an electronic transmission range selection (ETRS) system.

FIG. 2 schematically illustrates a portion of the powertrain 10. The powertrain 10 includes an engine 12, such as an internal combustion engine, and an automatic transmission 14 operatively coupled to the engine 12. The engine 12 produces driving torque that is transferred through the transmission 14 at varying gear ratios to drive at least one pair of wheels (not shown). The transmission 14 is coupled to the vehicle body 11 (FIG. 1) and includes a system housing 34 for supporting various components. A driver interface device 16 enables a vehicle operator to select various transmission range positions. The driver interface device 16 can include a lever, switches, dials, push buttons or any other type of input interface. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends a control signal to a transmission control module (TCM) 18 based on the selected operating range of the transmission 14.

The TCM 18 signals an electronic transmission range selection (ETRS) system 20 to shift the transmission 14 to the corresponding range in response to the control signal. For purposes of clarity, the ETRS system 20 is considered to be operating in a Park mode when the transmission 14 is in its Park mode of operation and to be operating in an Out-of-Park mode when the transmission 14 is in any other of the available ranges. The powertrain 10 includes an engine control module (ECM) 33 capable of receiving inputs from and send control signals to the engine 12. Additionally, the ECM 33 interfaces with the ETRS system 20 and the TCM 18 to determine the operational range of the transmission 14.

Figure 3:
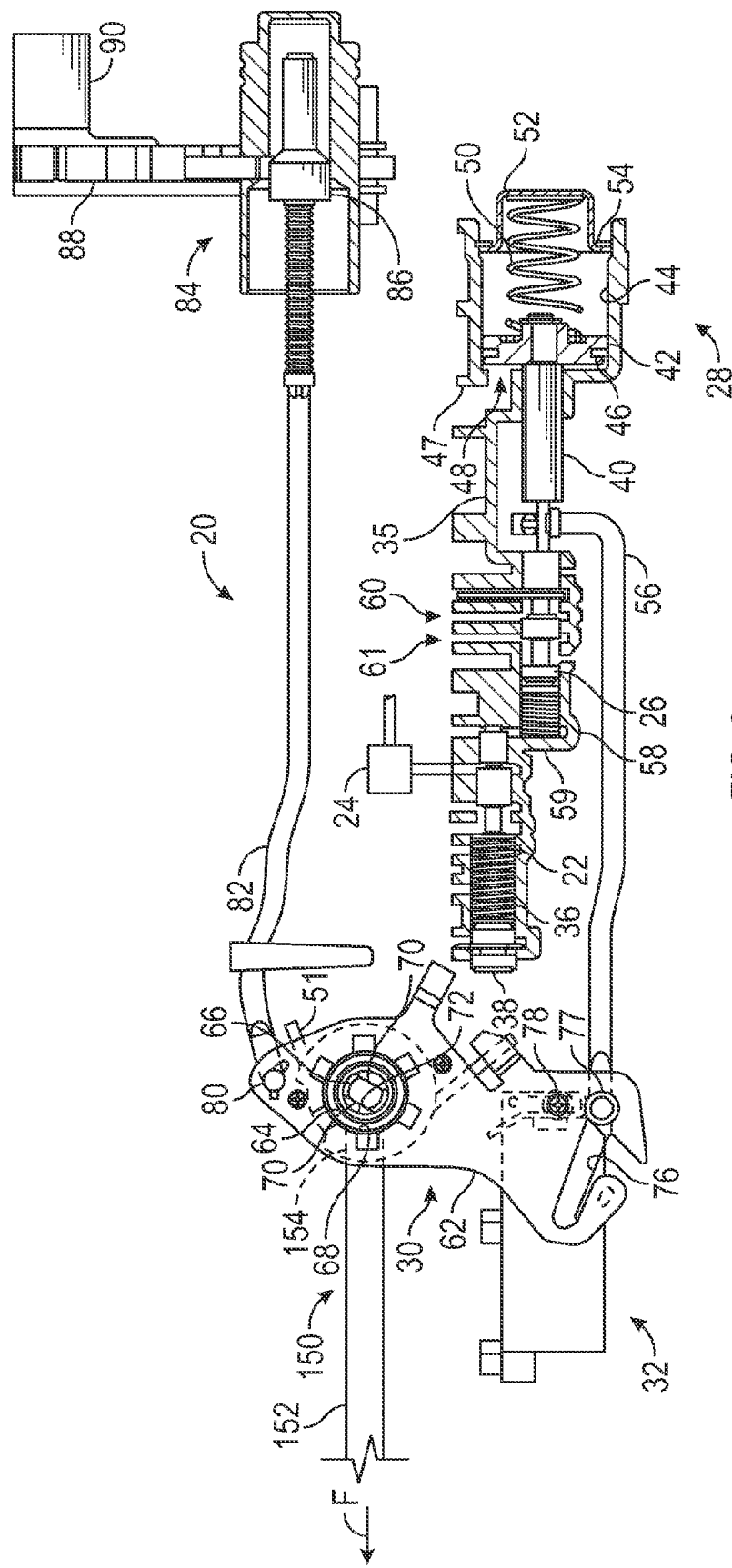
FIG. 3 a schematic, partially cross-sectional, side view of the ETRS system in a Park mode and a manual park release actuator operatively coupled to the ETRS system.
Figure 4:
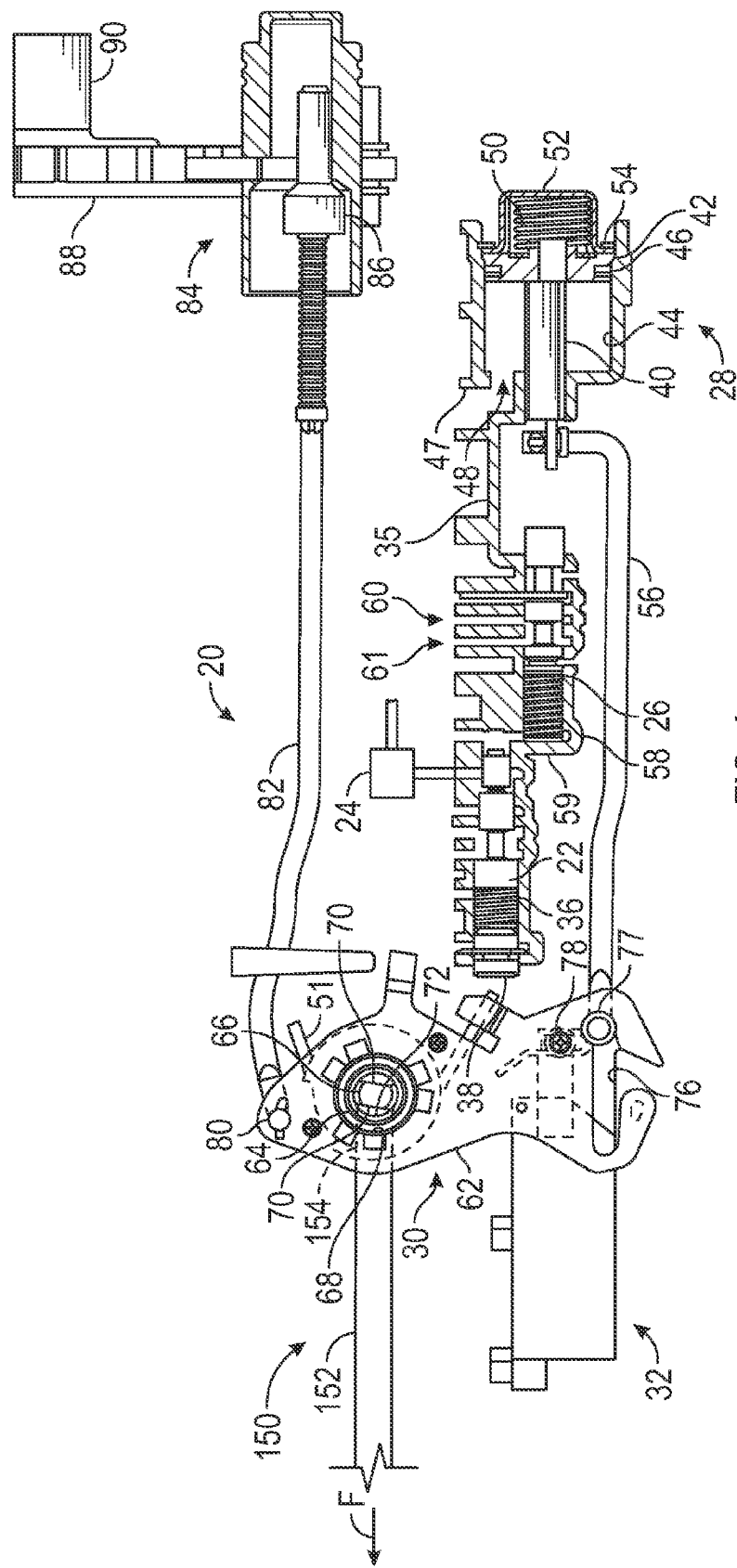
FIG. 4 is a schematic, partially cross-sectional, side view of the ETRS system, shown in FIG. 3, in an Out-of-Park mode.

Referring now to FIGS. 3 and 4, the ETRS system 20 is an integral part of the transmission 14 and operates to manipulate the flow of pressurized fluid to shift the transmission 14 between its various transmission ranges. The ETRS system 20 includes a park servo valve 22, a valve solenoid 24, a forward-reverse enable (FRE) valve 26, a hydraulic servo assembly 28, and a two-position park lever assembly 30. The ETRS system 20 also includes a park solenoid 32 that prevents shifting from the Out-of-Park mode into the Park mode in the event of a loss of pressurized fluid under specific circumstances.

The components of the ETRS system 20 are shown supported within a system housing 34 (FIG. 2) of the transmission 14. The system housing 34 (FIG. 2) defines a valve body housing 35 having a series of fluid flow passages. FIG. 3 illustrates the position of the various components when the ETRS system 20 is in a Park mode. In contrast, FIG. 4 illustrates the same components moved to positions corresponding to the ETRS system 20 in an Out-of-Park mode. In particular, the park servo valve 22 is slidably supported within the valve body housing 35 for movement between a first position (FIG. 3) and a second position (FIG. 4). The park servo valve 22 is biased to its first position by a spring 36. The spring 36 is disposed between a fixed spring seat 38 and the park servo valve 22. In its first position, the park servo valve 22 prohibits the flow of pressurized fluid to the hydraulic servo assembly 28. The valve solenoid 24 can be selectively actuated to control the supply of pressurized fluid required for moving the park servo valve 22 between its first and second positions.

With continued reference to FIGS. 3 and 4, the hydraulic servo assembly 28 is shown to include a servo pin 40 having a servo piston 42 fixed thereto. The servo piston 42 is slidably disposed within a cylinder or bore 44 defined by the valve body housing 35 and includes a piston seal 46 disposed about the periphery of the servo piston 42. A port 47 defined by the valve body housing 35 provides a fluid communication path to a pressure chamber 48 formed within the cylinder 44. The servo piston 42 and servo pin 40 are biased to a first position, as shown in FIG. 3, by a spring 50 and a torsion spring 51. The spring 50 sits between the servo piston 42 and a servo cap 52, which is fixed to the valve body housing 35 by a retainer ring 54. An opposite end of the servo pin 40 abuts one end of the FRE valve 26 and is fixed to a first end of an elongated servo link rod 56. The servo link rod 56 operatively connects the servo pin 40 to the park lever assembly 30. The flow of pressurized fluid through the port 47 into the pressure chamber 48 induces movement of the servo piston 42 and servo pin 40 to a second position, as shown in FIG. 4, against the biasing force exerted thereon by the spring 50 and the torsion spring 51 of the park lever assembly 30. Movement of the servo pin 40 from its first position to its second position causes the servo link rod 56 to move from a first position, as shown in FIG. 3, to a second position, as shown in FIG. 4. Furthermore, such movement of the servo pin 40 to its second position acts to release it from engagement with the FRE valve 26.

The FRE valve 26 is slidably disposed within a valve chamber formed in the system housing 34 for movement between a first position, shown in FIG. 3, and a second position, shown in FIG. 4. When the servo pin 40 of the hydraulic servo assembly 28 is in its first position, the spring 50 and the torsion spring 51 of the park lever assembly 30 hold the FRE valve 26 in its first position in opposition to the biasing force exerted thereon by a spring 58. The spring 58 is seated between the FRE valve 26 and a wall portion 59 of the system housing 34. In its first position, the FRE valve 26 blocks the flow of pressurized fluid to the shifting components of the transmission 14. However, upon movement of the servo pin 40 of the hydraulic servo assembly 28 to its second position, the biasing force of the spring 58 forcibly moves the FRE valve 26 to its second position. With the FRE valve 26 in its second position, the flow of pressurized fluid from port 60 is permitted to the shifting components of transmission 14 through port 61 at a desired line pressure.

The park lever assembly 30 includes a lever 62, a bushing 64 and a manual shaft 66. The manual shaft 66 is rotatably supported in one or more aligned apertures defined by the system housing 34 (FIG. 2) and extends through the bushing 64. The bushing 64 is retained in an aperture 68 formed in the lever 62, whereby the lever 62 is rotatably supported by the bushing 64.

The manual shaft 66 includes a plurality of flats 70 formed along a portion thereof. The manual shaft 66 is received through a keyed aperture 72 of the bushing 64. In particular, flats 70 of the manual shaft 66 engage the bushing 64, thereby fixing the manual shaft 66 and bushing 64 for unitary rotation therewith. However, the lever 62 is free to rotate about the bushing 64. As a result, during normal operation, the manual shaft 66 does not rotate as the ETRS system 20 is moved from the Park mode to the Out-of-Park mode, thereby minimizing drag associated with a manual park release assembly 150.

The lever 62 further includes a slot 76 with a pin 77, fixed to an end of the servo link rod 56, engaging the slot 76. As such, the servo link rod 56 connects lever 62 to the servo pin 40 of the hydraulic servo assembly 28. A pin 78 extends from the lever 62 and interfaces with moveable components of the park solenoid 32. An aperture 80, defined by the lever 62, facilitates attachment of an end of an actuator rod 82 to the lever 62. The torsion spring 51 is disposed about the bushing 64 and functions to bias the lever 62 to a Park position, as shown in FIG. 3.

The actuator rod 82 is coupled to, or engages, a park pawl mechanism or assembly 84 that operates to selectively move a park pawl 86 into and out of engagement with a toothed wheel 88 that is rigidly mounted with respect to an output shaft 90 of the transmission 14. The park pawl mechanism 84 selectively locks the output shaft 90 of the transmission 14. With the park pawl 86 engaged with the toothed wheel 88, the ETRS system 20 is in the Park mode, as shown in FIG. 3. Alternately, with the park pawl 86 disengaged from the toothed wheel 88, the ETRS system 20 is in the Out-of-Park mode, as shown in FIG. 4. The movement of servo pin 40 from its first position to its second position causes the servo link rod 56 to bias the lever 62. In response, the lever 62 is induced to rotate from the Park position to the Out-of-Park position against the biasing force of the torsion spring 51. Such rotary movement of the lever 62 causes the actuator rod 82 to move from a first position to a second position thereby moving the park pawl 86 to the Out-of-Park position.

The ETRS system 20 can be manually actuated in the event of a loss of electrical power and fluid pressure within the vehicle 8. A manual park release assembly 150 is operatively connected to the park lever assembly 30. For example, the manual park release assembly 150 may be operatively connected to the manual shaft 66. A vehicle operator or maintenance personnel can manually rotate the manual shaft 66 using the manual park release assembly 150, as discussed in detail below, in order to induce rotation of the detent lever 62 from its park position to its out-of-park position. As described above, rotation of the detent lever 62 enables shifting of the transmission range to the Out-of-Park position. In this manner, the vehicle 8 is free to roll without the transmission prohibiting rolling motion.

With reference again to FIGS. 3 and 4, the vehicle 8 includes the manual park release assembly 150 for manually moving the detent lever 62 from its Park position (FIG. 3) to the Out-of-Park position (FIG. 4) in the event of a loss of electrical power and fluid pressure in the vehicle 8. As used herein, the term "manual park release assembly" refers to an assembly capable of being manipulated (manually, mechanically, or electronically) in order to shift the detent lever 62 from its Park position (FIG. 3) to the Out-of-Park position. The manual park release assembly 150 includes a manual park release actuator 152, such as a flexible cable, operatively coupled to the detent lever 62. As used herein, the term "manual park release actuator" means an actuator, such as a cable, that can be manually manipulated in order to shift the automatic transmission 14 from the Park mode to the Out-of-Park mode. As such, the manual park release actuator 152 may be simply referred to as an actuator.

In the depicted embodiment, the manual park release actuator 152 may be operatively coupled to the detent lever 62 via the manual shaft 66. In operation, a force in the direction indicated by arrow F can be applied to the manual park release actuator 152 in order to urge the detent lever 62 to move from its Park position (FIG. 3) to its Out-of-Park position (FIG. 4), thereby shifting the transmission 14 from Park mode to an Out-of-Park mode. The manual park release actuator 152 may alternatively be referred to as a flexible cable.

Figure 5:
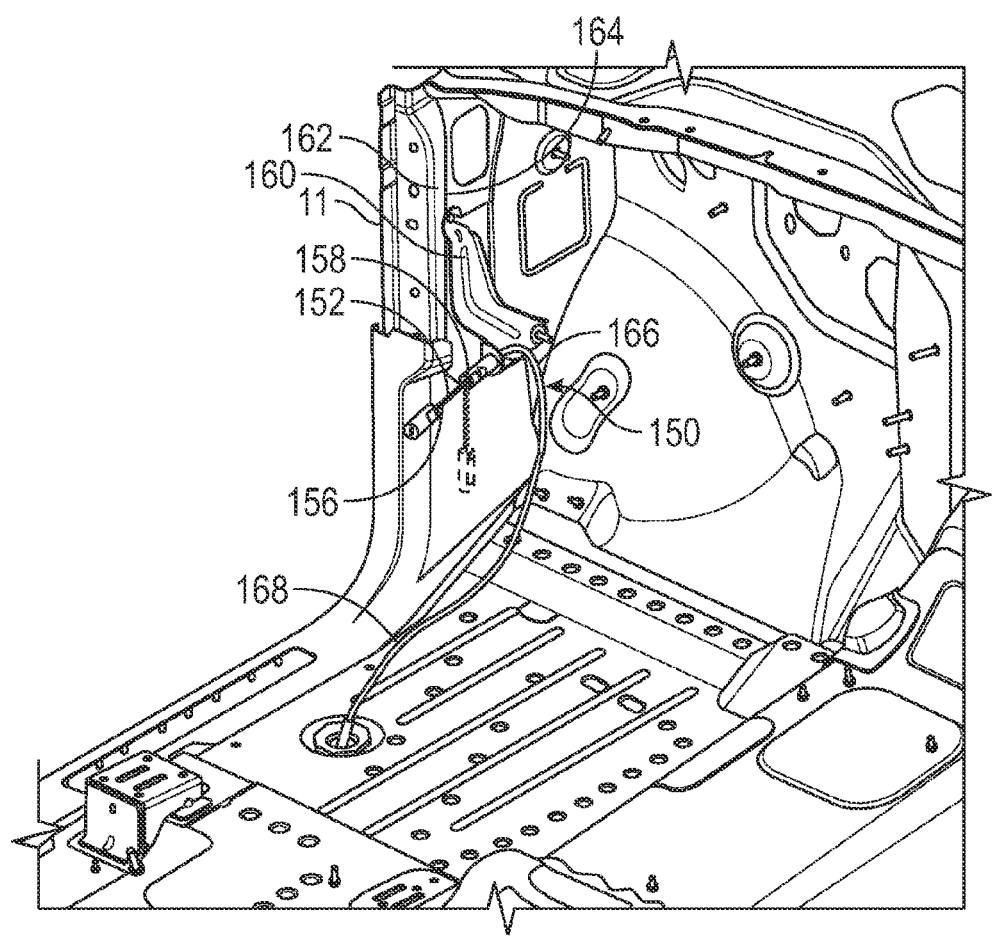
FIG. 5 is a schematic, perspective view of the vehicle shown in FIG. 1, showing a vehicle body and a manual park release assembly coupled to the vehicle body.
Figure 6:
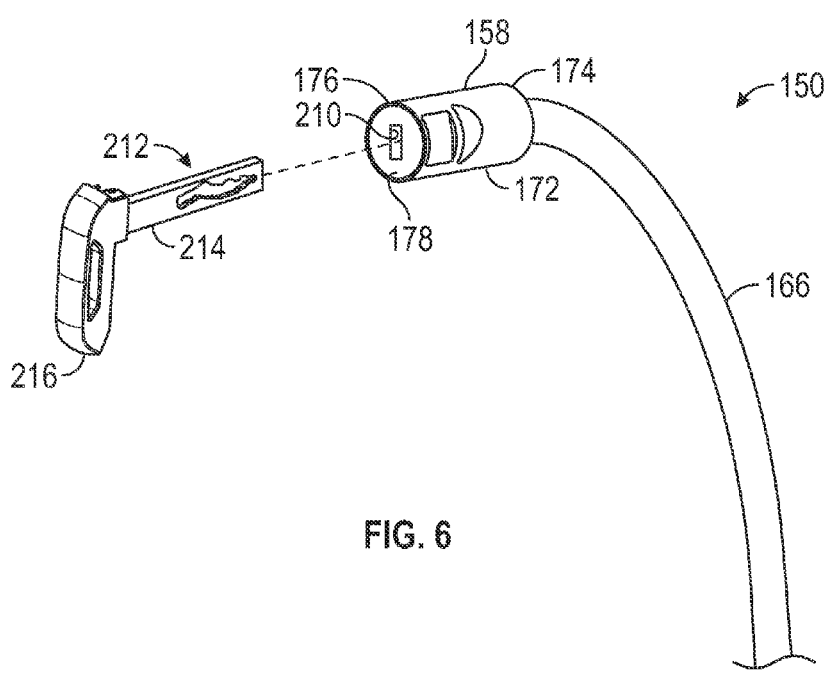
FIG. 6 is a schematic, perspective view of the manual park release assembly shown in FIG. 5, wherein the manual park release assembly includes a housing, a locking device inside the housing, and a key, which is shown spaced from the locking device.

The manual park release actuator 152 includes a first end portion 154 and a second end portion 156 (FIG. 5). The first end portion 154 of the manual park release actuator 152 is operatively coupled to the transmission 14. Specifically, the first end portion 154 of the manual park release actuator 152 is operatively coupled to the detent lever 62. Consequently, applying a force in the direction indicated by arrow F to the manual park release actuator 152 causes the detent lever 62 to move from the Park position (FIG. 3) to the Out-of-Park position (FIG. 4). The vehicle operator or maintenance personnel can apply this force to the manual park release actuator 152 via the second end portion 156 (FIG. 5).

With reference to FIG. 5, the manual park release actuator 152 may be part of the manual park release assembly 150 (FIG. 4). The manual park release actuator 152 may include a sheath 168 surrounding a portion of an actuator body 170 (FIG. 8) described below. In addition to the manual park release actuator 152, the manual park release assembly 150 includes a housing 158 coupled the vehicle body 11. The housing 158 partially encloses at least a portion of the manual park release actuator 152. In FIG. 5, the second end portion 156 of the manual park release actuator 152 may be disposed outside the housing 158 (as shown in solid lines). As shown in dashed lines, the second end portion 156 of the manual park release actuator 152 may be fixed to the housing 158.

The housing 158 may be wholly or partly made of a substantially rigid material, such as steel, and is coupled to the vehicle body 11 via, for example, a coupling structure 160, such as a bracket or any other suitable structure or mechanism capable of coupling the housing 158 to the vehicle body 11. In the depicted embodiment, the coupling structure 160 is directly coupled to the hinge pillar 162 of the vehicle body 11. Specifically, the hinge pillar 162 defines a pillar surface 164 facing the passenger compartment 19 (FIG. 1). More particularly, the pillar surface 164 faces the driver's side of the passenger compartment 19. Accordingly, housing 158 is coupled to the hinge pillar 162 via the pillar surface 164 facing the passenger compartment 19 (FIG. 1).

With reference to FIGS. 6-9, the manual park release assembly 150 further includes a tube 166 coupled to the housing 158 at the first housing end 174. The tube 166 may be wholly or partly made of a substantially rigid material, such as steel. The tube 166 is hollow and encloses a portion of the manual park release actuator 152. In the depicted embodiment, the tube 166 has a curved profile and defines a bore 167 (or any other suitable opening) configured, shaped, and sized to receive at least a portion of the manual park release actuator 152. Thus, the manual park release actuator 152 is partially disposed in the tube 166.

With continued reference to FIGS. 6-11, the housing 158 includes a housing body 172, which may have a substantially cylindrical shape. The housing body 172 defines a first housing end 174 and a second housing end 176 opposite the first housing end 174. The tube 166 extends from the first housing end 174 of the housing body 172. The housing 158 defines an outer housing surface 180 and an inner housing surface 182 opposite the outer housing surface 180. The inner housing surface 182 defines an inner cavity 184. In other words, the housing 158 defines the inner cavity 184. The inner cavity 184 extends through at least a portion of the housing body 172.

Figure 10:
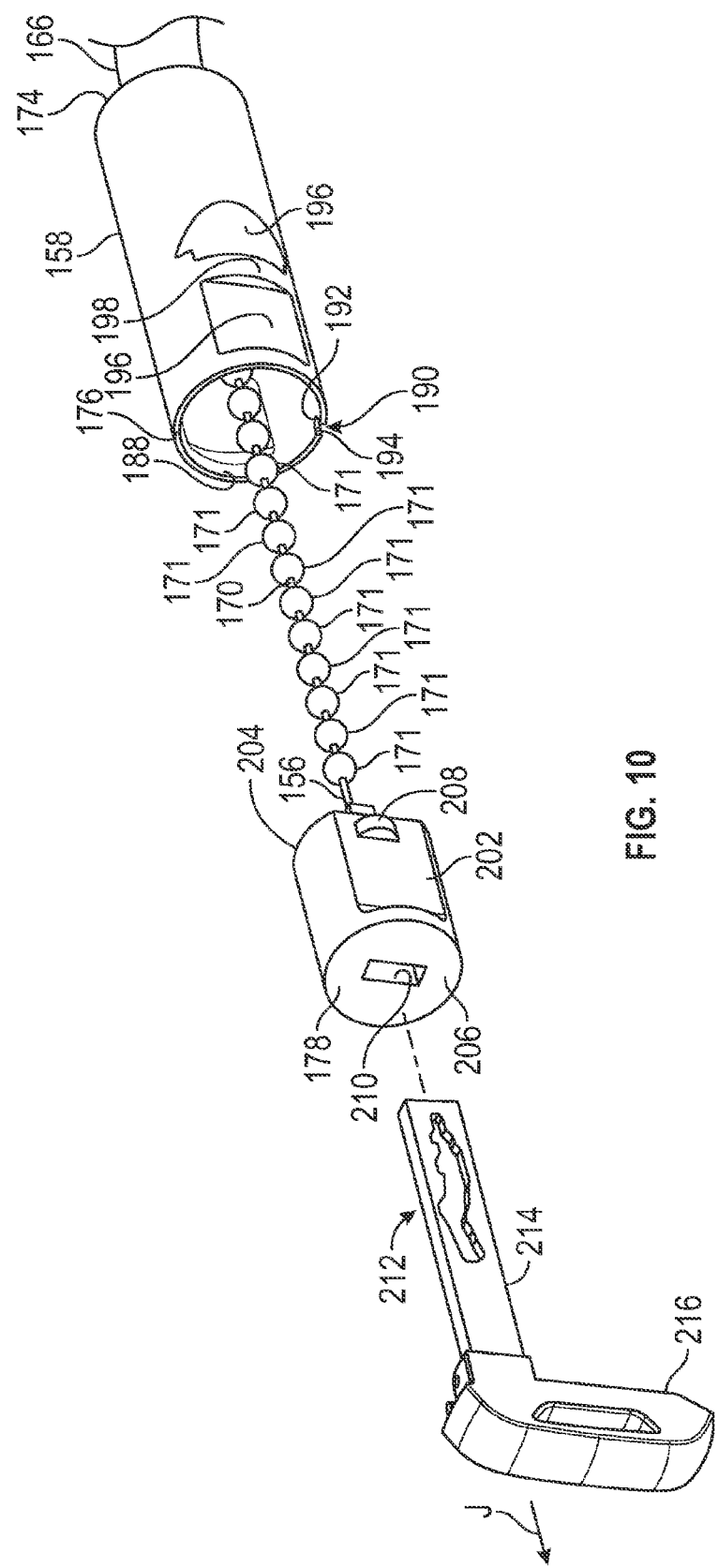
FIG. 10 is a schematic, perspective view of the manual park release assembly of FIG. 6, showing the manual park release actuator partially disposed outside the housing, and the key decoupled from the locking device.

The housing 158 further defines a first aperture 186 (FIG. 8) at the first housing end 174 and a second aperture 188 at the second housing end 176 (FIG. 10). In other words, the first housing end 174 defines the first aperture 186, and the second housing end 174 defines the second aperture 188. The second aperture 188 leads to the inner cavity 184. The first and second apertures 186, 188 are in communication with the inner cavity 184. The first aperture 186 is in direct communication with the bore 167, thereby allowing the manual park release actuator 152 to extend through the housing 158 and the tube 166. The second aperture 188 allows at least a portion of the manual park release actuator 152, such as its second end portion 156, to be pulled out of the housing 158. The second aperture 188 may be referred to as an aperture.

With specific reference to FIG. 10, the housing 158 further defines an opening 190 at the second housing end 176. The housing 158 is in direct communication with the inner cavity 184 and the second aperture 188. The opening 190 is configured, shaped, and sized to receive at least a portion of the manual park release actuator 152. Moreover, the opening 190 extends through the outer and inner housing surface 180, 182. As such, at least a portion of the manual park release actuator 152 can extend from the inner cavity 184 to outside the housing 158 through the opening 190. The opening 190 may be configured as a slot and defines a closed end 192 and an open end 194 opposite the closed end 192. The open end 194 is in communication with the second aperture 188. The first housing end 174 is closer to the closed end 192 than to the open end 194 of the opening 190.

With reference again to FIGS. 6-11, the housing 158 further includes a plurality of recessed walls 196 and at least one housing protrusion 198 disposed between at least two recessed walls 196. In the depicted embodiment, the housing 158 includes two housing protrusions 198 extending radially outward from the housing body 172. Each housing protrusion 198 may be substantially hollow and defines a protrusion cavity 200 (FIG. 9).

Figure 11:
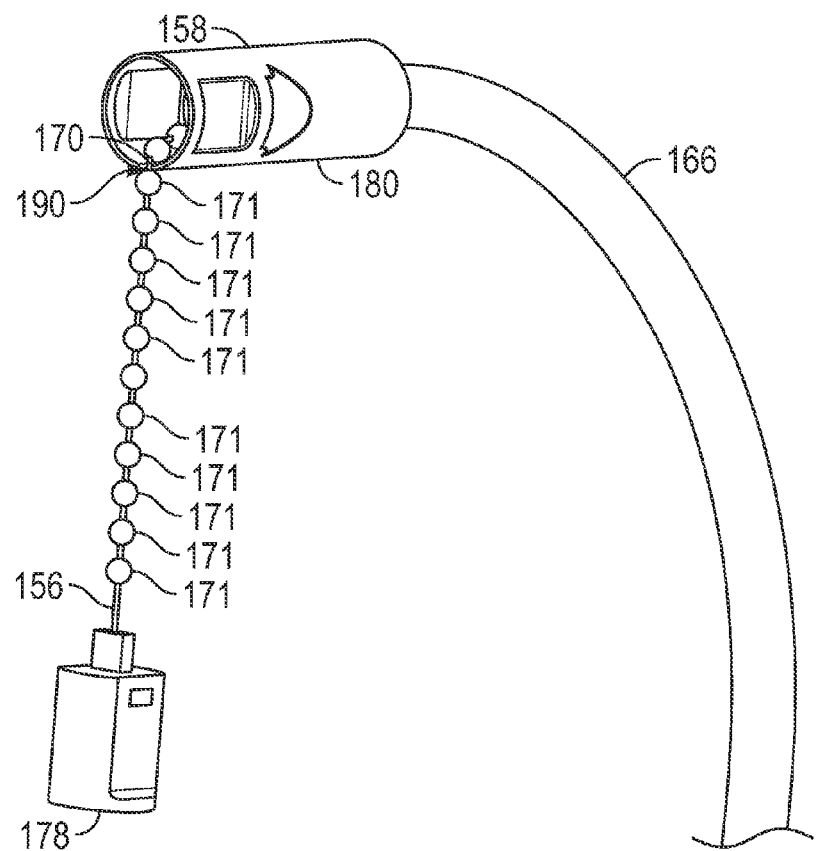
FIG. 11 is a schematic, perspective view of the manual park release assembly of FIG. 6, showing the manual park release actuator fixed to the housing in a second position.
Figure 12:
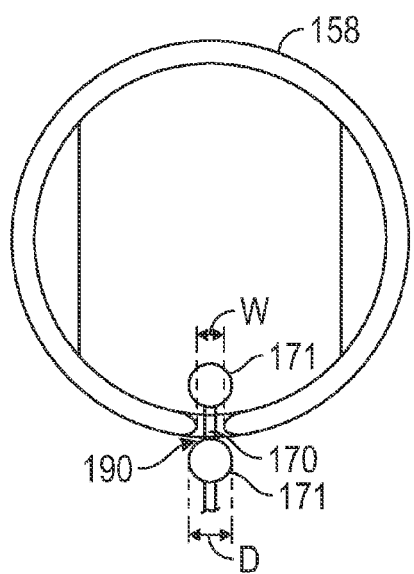
FIG. 12 is a schematic, front view of a portion of the manual park release actuator assembly, showing the manual park release actuator fixed to the housing in the second position.

With continued reference to FIGS. 6-12, the housing body 172 is configured, shaped, and sized to receive at least a portion of a locking device 178. Specifically, the inner cavity 184 is configured, shaped, and sized to receive the locking device 178. The locking device 178 may be wholly or partly made of a substantially rigid material, such as a rigid polymer, and can lock the manual park release actuator 152 in a first position (FIG. 8). When the manual park release actuator 152 is in the first position relative to the housing 158, the transmission 14 (FIG. 2) is in the Park mode. The locking device 178 can therefore retain the manual park release actuator 152 in the first position in order to maintain the transmission 14 in the Park mode. Moreover, the locking device 178 can move relative to the housing 158 between a locked position (FIG. 8) and an unlocked position (FIG. 9). In the depicted embodiment, the locking device 178 can rotate relative to the housing 158 about the longitudinal axis R between the locked position (FIG. 8) and the unlocked position (FIG. 9). When the locking device 178 is in the unlocked position (FIG. 9), the manual park release actuator 152 can be moved relative to the housing 158 from the first position (FIG. 8) to a second position (FIG. 11). When the manual park release actuator 152 is in the second position (FIG. 11) relative to the housing 158, the transmission 14 (FIG. 2) is in the Out-of-Park mode.

In the depicted embodiment, the locking device 178 can be at least partially disposed in the inner cavity 184 and is coupled to the manual park release actuator 152 (FIG. 8). In the locked position, the locking device 178 can retain the second end portion 156 of the manual park release actuator 152 inside the housing 158. The locking device 178 includes a device body 202 having a first device end 204 and a second device end 206. The second device end 206 is opposite the first device end 204. The locking device 178 further includes at least one compressible protrusion 208 extending radially outward from the device body 202. In the depicted embodiment, the locking device 178 includes two diametrically opposed compressible protrusions 208, and the compressible protrusions 208 are closer to the first device end 204 than the second device end 206. Regardless of the quantity, the compressible protrusion 208 are wholly or partly made of a resilient material and are capable of compressing when the locking device 178 is in the unlocked position while disposed inside the housing 158 as shown in FIG. 9. Specifically, when the locking device 178 is in the locked position (FIG. 8), the compressible protrusions 208 are disposed inside the housing protrusion 198. In other words, when the locking device 178 is in the locked position, each compressible protrusion 208 is disposed in a protrusion cavity 200.

When the locking device 178 is in the locked position, the direct contact between the compressible protrusions 208 and the housing protrusions 198 prevents, or at least inhibits, axial movement of the locking device 178 relative to the housing 158 along the longitudinal axis R. Because the manual park release actuator 152 is coupled to the locking device 178, the manual park release actuator 152 is precluded from moving axially along the longitudinal axis R with respect to the housing 158 when the locking device 178 is in the locked position. Moving the locking device 178 from the locked position (FIG. 8) to the unlocked position (FIG. 9) causes the compressible protrusions 208 to compress, thereby withdrawing from the protrusion cavities 200. To do so, the locking device 178 may be rotated about the longitudinal axis R. As the locking device 178 rotates relative to the housing 158 about the longitudinal axis R, the compressible protrusions 208 gradually withdraw from the protrusions cavity 200, and the housing body 172 gradually compresses the compressible protrusions 208. When the compressible protrusions 208 are compressed, the locking device 178 is in the unlocked position (FIG. 9) and, therefore, the locking device 178 can move axially relative to the housing 158. In other words, in the locked position, the locking device 178 can move relative to the housing 158 along the longitudinal axis R. Because the locking device 178 is coupled to the manual park release actuator 152, the manual park release actuator 152 can move axially relative to the housing 158 when the locking device 178 is in the unlocked position (FIG. 9).

The locking device 178 defines a key hole 210 configured, shaped, and sized to receive a key 212. The key hole 210 extends into the device body 202 and is located at the second device end 206. The key 212 may include a shank 214, such as a blade, and a handle 216, such as a bow. The handle 216 is operatively coupled to the shank 214. The shank 214 can be inserted into the key hole 210. Once the shank 214 is in the key hole 210, a user can rotate the key 212, via the handle 216, about the longitudinal axis R in order to rotate the locking device 202 between the locked position (FIG. 8) and the unlocked position (FIG. 9). Once the locking device 178 is in the unlocked position (FIG. 9), a force J (FIG. 10) may be applied in a direction away from the housing 158 to withdraw the locking device 178 from the housing 158. The locking device 178 may include a tether or loop (not shown) coupled to the device body 202 to aid a user to apply the force J (FIG. 10). Because the locking device 178 is coupled to the manual park release actuator 152, applying the force J (FIG. 10) causes the manual park release actuator 152 to move from the first position (FIG. 8) toward the second position (FIG. 11). In the second position, a portion of the manual park release actuator 152, such as its second actuator end 156, is outside the housing 158. While the manual park release actuator 152 moves from the first position (FIG. 8) to the second position (FIG. 11), the manual park release actuator 152 may be in a third or intermediate position (FIG. 10). In the third position (FIG. 10), the manual park release actuator 152 is partially disposed outside of the housing 158 but no part of the manual park release actuator 152 is fixed to the housing 158. In the second or final position, however, the manual park release actuator 152 is fixed to the housing 158 as shown in FIG. 11.

The manual park release actuator 152 includes at least one mechanical stop 171, such as a spherical bead, to help fix the manual park release actuator 152 to the housing 158 in the second position (FIG. 11). In the depicted embodiment, the manual park release actuator 152 includes a plurality of mechanical stops 171 located at or near the second end portion 156. As discussed above, the manual park release actuator 152 includes the actuator body 170, such a flexible cable. The mechanical stops 171 (e.g., beads) are coupled to the actuator body 170 (e.g., flexible cable) and may be spaced apart from one another along the actuator body 170. In other words, the mechanical stops 171 are spaced from one another along the length of the actuator body 170. The actuator body 170 is configured, shaped, and sized to be at least partially disposed in the opening 190 (e.g., slot), whereas the mechanical stops 171 are not configured, shaped, and sized to be received in the opening 190. In other words, none of the mechanical stops 171 (e.g., beads) fits in the opening 190 (e.g., slot). Thus, each mechanical stop 171 has a width D, such as a diameter, that is larger than a width W of the opening 190. When the manual park release actuator 152 is in the first position (FIG. 8), at least one or all the mechanical stops 171 are disposed in the inner cavity 184. When a portion of the actuator body 170 is disposed in the opening 190, at least one mechanical stop 171 is disposed outside the housing 158. At least one mechanical stop 171 may contact the outer housing surface 180, thereby fixing the manual park release actuator 152 in the second position. In other words, at least one mechanical stop 171 is in contact with the housing 158 when the manual park release actuator 152 is in the second position. In particular, the contact between the mechanical stop 171 (e.g., spherical bead) and the outer housing surface 180 prevents, or at least inhibits, the manual park release actuator 152 from moving further into the inner cavity 184 toward the first position (FIG. 8). In other words, the manual park release actuator 152 latches onto the housing 158 when a portion of the actuator body 170 is disposed in the opening 190, and at least one of the mechanical stop 171 is outside the housing 158 and contacts the housing 158 in order to fix the manual park release actuator 152 in the second position (FIG. 11).

Figure 7:
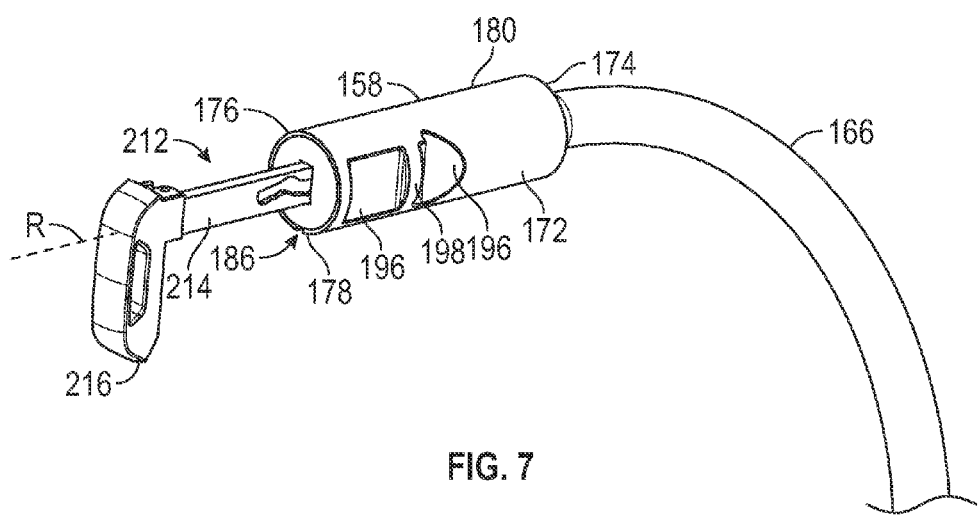
FIG. 7 is a schematic, perspective view of the manual park release assembly and the key shown in FIG. 6 coupled to the locking device.

With continued reference to FIGS. 6-11, the transmission 14 (FIG. 2) can be shifted from the Park mode to the Out-of-Park mode using the manual park release assembly 150. To do so, the shank 214 of the key 212 is inserted into the key hole 210 (FIG. 6) of the locking device 178 as shown in FIG. 7. Then, the key 212 is rotated relative to the housing 158 about the longitudinal axis R in order to move the locking device 178 from the locked position (FIG. 8) to the unlocked position (FIG. 9). At this point, rotating the key 212 relative to the housing 158 causes the locking device 178 to rotate relative to the housing 158 about the longitudinal axis R. As the locking device 178 rotates about the longitudinal axis R, the compressible protrusions 208 withdraw from the protrusion cavity 200, and the housing body 172 compresses the compressible protrusions 208. Once the compressible protrusions 208 are compressed as shown in FIG. 9, the force J (FIG. 10) is applied to the locking device 178 (in a direction away from the housing 158) in order to remove the locking device 178 from the inner cavity 184 of the housing 158 as shown in FIG. 10. Because the manual park release actuator 152 is coupled to the locking device 178, moving the locking device 178 away from the housing 158 causes the second end portion 156 of the manual park release actuator 152 to move away from the housing 158 as well. At this point, the manual park release actuator 152 is moving from the first position (FIG. 8) toward the second position (FIG. 11). The locking device 178 should be moved away from the housing 158 until at least at one mechanical stop 171 (e.g., spherical bead) is disposed outside the housing 158 as shown in FIG. 10. As also shown in FIG. 10, the shank 214 of the key 212 may be withdrawn from the key hole 210. Once at least one mechanical stop 171 (e.g., spherical bead) is outside the housing 158, the actuator body 170 (e.g., flexible cable) may be partially disposed in the opening 190 (e.g., slot) in order to fix the manual park release actuator 152 to the housing 158 at its second position as shown in FIG. 11. At least one mechanical stop 171 contacts the outer housing surface 180 of the housing 158 while the actuator body 170 is partially disposed in the opening 190. As a consequence, the engagement between the mechanical stop 171 and the outer housing surface 180 of the housing 158 precludes, or at least inhibits, the manual park release actuator 152 from moving relative to the housing 158 toward the first position (FIG. 8). When the manual park release actuator 152 is moved from the first position toward the second position (FIG. 11), the transmission 14 (FIG. 2) shifts from the Park mode to the Out-of-Park mode. In other words, the manual park release actuator 152 is operatively coupled to the transmission 14 such that moving the manual park release actuator 152 from the first position to the second position causes the transmission 14 to shift from the Park mode to the Out-of-Park mode.

Figure 13:
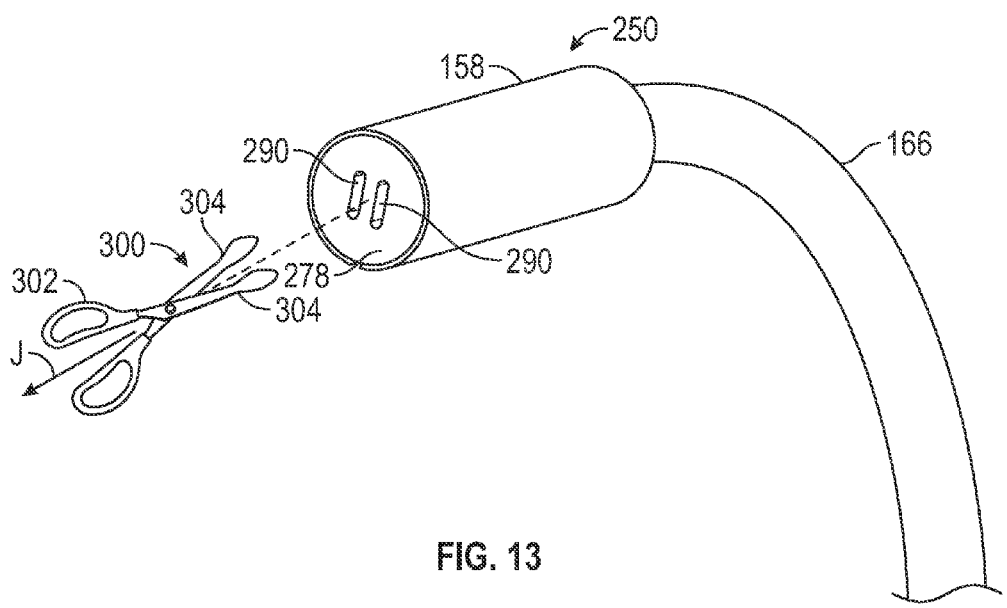
FIG. 13 is a schematic, perspective view of a manual park release assembly in accordance with another embodiment.

FIG. 13 schematically illustrates another embodiment of a manual park release assembly 250 that is substantially similar to the manual park release assembly 150 described above, except for the locking device 278. In this embodiment, the locking device 278 is substantially similar to the locking device 178, except that the locking device 278 defines two or more holes 290 configured, shaped, and sized to receive portions of a removal tool 300. The removal tool 300 may be configured as a scissor-type tool and includes a tool handle 302 and two or more tool prongs 304. Each tool prong 304 is configured, shaped, and sized to be received in the holes 290. The tool prongs 304 may be pivotally coupled to each other. As such, the tool prongs 304 can move toward and away from each other. To decouple the locking device 278 from the housing 158, each tool prong 304 is inserted into one of the holes 290. Then, the tool prongs 304 are moved toward each other to grasp the locking device 278. Next, the force J is applied to the tool 300 in order to withdraw the locking device 278 from the housing 158. The tool 300 could have other shapes and could be capable of removing the locking device 278 or any other cap, cover, or plug.

Figure 14:
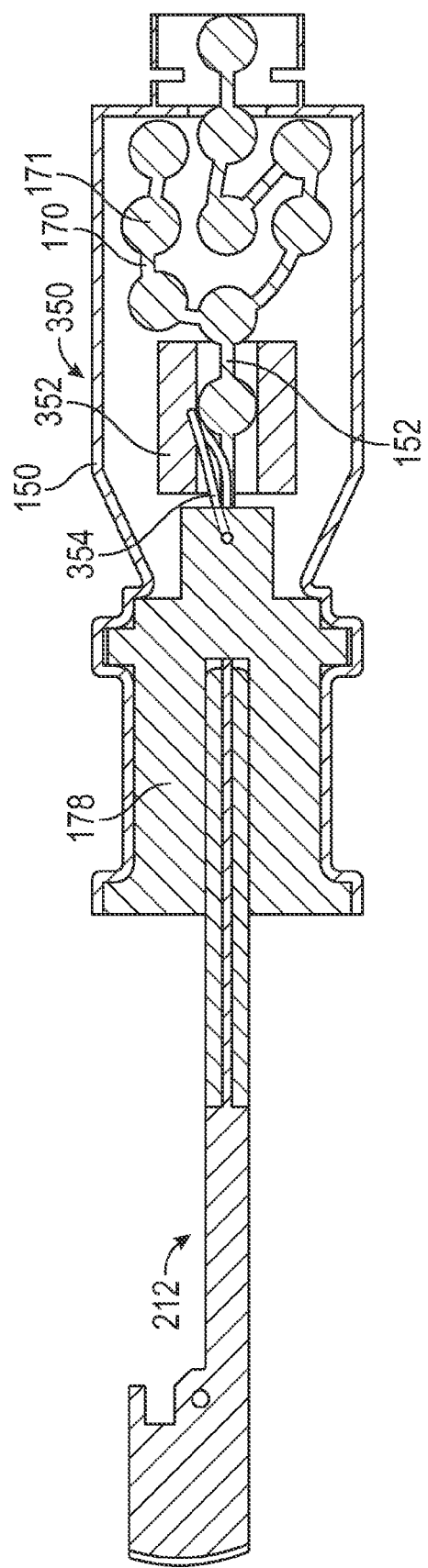
FIG. 14 is a schematic, cross-sectional view of a manual park release assembly according to another embodiment of the present disclosure, wherein the manual park release assembly includes a tether, and the tether is showed stowed in the housing.
Figure 15:
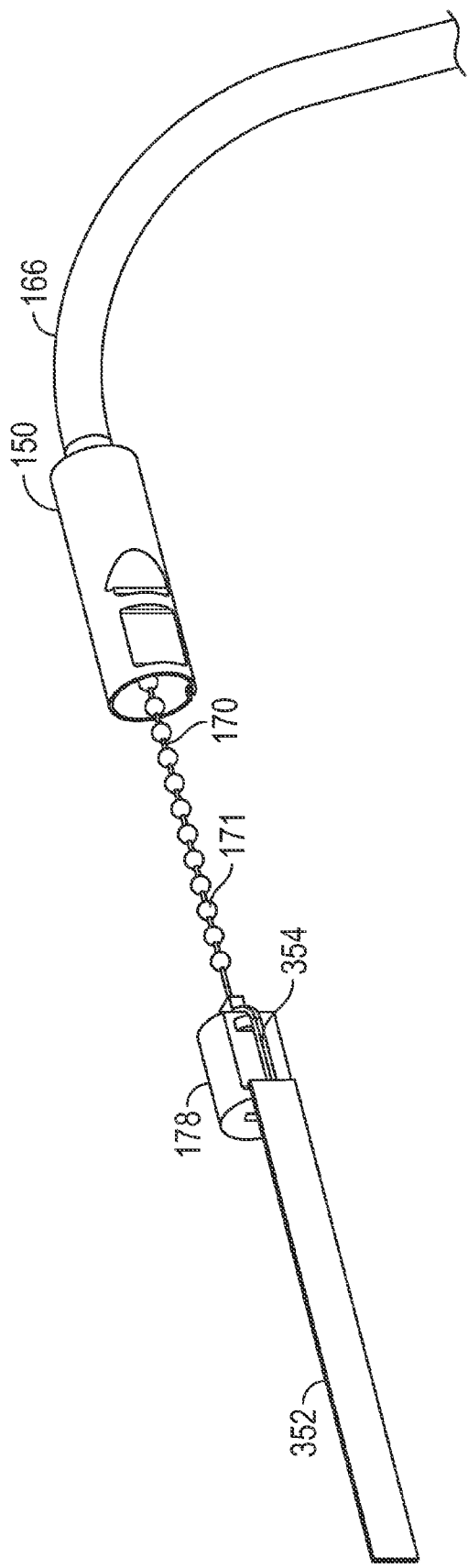
FIG. 15 is a schematic, perspective view of the manual park release assembly of FIG. 14, showing the tether in a deployed position outside the housing.

FIGS. 14 and 15 schematically illustrates another embodiment of a manual park release assembly 350 that is substantially similar to the manual park release assembly 150 described above, except that it additionally includes a tether 352 coupled to the locking device 178. The tether 352 may be a hand or wrist tether and can aid in pulling the locking device 178 out of the housing 150. A flexible cable 354 may couple the tether 350 to the locking device 178. In it stowed position, the tether 350 is inside the housing 158 and is wrapped around at least a portion of the manual park release actuator 152 as shown in FIG. 14. In its deployed position, the tether 350 is outside the housing 150 and can be manually pulled to move a portion of the manual park release actuator 152 outside the housing 150 as shown in FIG. 15.

While the best modes for carrying out the invention have been described in detail, those familiar with the art to which this invention relates will recognize various alternative designs and embodiments for practicing the invention within the scope of the appended claims.

The invention claimed is:

1. A manual park release assembly for shifting a transmission from a Park mode to an Out-of-Park mode, the manual park release assembly comprising:
a housing defining an inner cavity and an opening in communication with the inner cavity, wherein the housing includes a housing body and at least one housing protrusion extending radially outward from the housing body, and the at least one housing protrusion is hollow so as to define a protrusion cavity;
a locking device at least partially disposed in the inner cavity, the locking device being rotatable relative to the housing about a longitudinal axis between a locked position and an unlocked position while remaining axially stationary relative to the housing along the longitudinal axis when rotating between the locked position and the unlocked position, wherein the locking device includes a device body and at least one compressible protrusion extending radially outward from the device body, and the at least one compressible protrusion is sized to be received in the protrusion cavity; and
a manual park release actuator coupled to the locking device, the manual park release actuator being movable relative to the housing between a first position and a second position when the locking device is in the unlocked position, wherein the manual park release actuator includes:
an actuator body sized to be at least partially received in the opening; and
a plurality of mechanical stops coupled to the actuator body, at least one of the mechanical stops being disposed outside the housing when the actuator body is at least partially disposed in the opening;
wherein, when the locking device is in the locked position, the at least one compressible protrusion is disposed in the protrusion cavity so as to preclude axial movement of the locking device relative to the housing along the longitudinal axis; and
wherein, when the locking device is in the unlocked position, the housing compresses the at least one compressible protrusion, and the compressible protrusion is disposed outside the protrusion cavity so as to allow axial movement of the locking device relative to the housing along the longitudinal axis.

2. The manual park release assembly of claim 1, wherein the manual park release actuator is operatively coupled to the transmission such that moving the manual park release actuator relative to the housing from the first position to the second position causes the transmission to shift from the Park mode to the Out-of-Park mode.

3. The manual park release assembly of claim 1, wherein the at least one mechanical stop is in contact with the housing when the manual park release actuator is in the second position.

4. The manual park release assembly of claim 1, wherein the at least one mechanical stop has a width that is larger than a width of the opening.

5. The manual park release assembly of claim 1, wherein the at least one mechanical stop is disposed in the inner cavity when the manual park release actuator is in the first position.

6. The manual park release assembly of claim 1, wherein the housing body defines an inner housing surface and an outer housing surface opposite the inner housing surface, the inner housing surface defines the inner cavity, and the opening extends through the inner and outer housing surfaces.

7. The manual park release assembly of claim 6, wherein the housing body defines a first housing end and a second housing end opposite the first housing end, and the opening is at the second housing end.

8. The manual park release assembly of claim 7, wherein the second housing end defines an aperture leading to the inner cavity.

9. The manual park release assembly of claim 8, wherein the aperture is in communication with the opening.

10. The manual park release assembly of claim 8, wherein the opening is a slot and defines a closed end and an open end opposite the closed end, the open end is in communication with the aperture, the open end is at the second housing end, and the first housing end is closer to the closed end than to the open end.

11. The manual park release assembly of claim 8, wherein the actuator body is a flexible cable and the at least one mechanical stop is a bead coupled to the flexible cable.

12. The manual park release assembly of claim 7, further comprising a tube coupled to the housing at the first housing end, wherein the manual park release actuator is partially disposed in the tube.

13. The manual park release assembly of claim 6, wherein the housing is made of a rigid material.

14. The manual park release assembly of claim 13, wherein the at least one housing protrusion contacts the at least one compressible protrusion when the locking device is in the locked position, and the at least one compressible protrusion is configured to gradually withdraw from the housing protrusion as the locking device rotates from the locked position to the unlocked position.

15. A vehicle, comprising:
a vehicle body;
a transmission operatively coupled within the vehicle body, the transmission having a Park mode and an Out-of-Park mode;

a housing coupled to the vehicle body, wherein the housing defines an inner cavity and an opening in communication with the inner cavity, the housing includes a housing body and at least one housing protrusion extending radially outward from the housing body, and the at least one housing protrusion is hollow; and a manual park release actuator at least partially disposed in the inner cavity, the manual park release actuator being movable relative to the housing between a first position and a second position, the manual park release actuator being operatively coupled to the transmission such that moving the manual park release actuator relative to the housing from the first position to the second position causes the transmission to shift from the Park mode to the Out-of-Park mode, wherein the manual park release actuator includes:

an actuator body sized to be at least partially received in the opening; and a plurality of mechanical stops coupled to the actuator body, wherein at least one of the mechanical stops is disposed outside the housing when the actuator body is at least partially disposed in the opening;

a locking device at least partially disposed in the inner cavity, the locking device being rotatable relative to the housing about a longitudinal axis between a locked position and an unlocked position while remaining axially stationary relative to the housing along the longitudinal axis when rotating between the locked position and the unlocked position, and the locking device including a device body and at least one compressible protrusion extending radially outward from the device body;

wherein the manual park release actuator is coupled to the locking device, and the manual park release actuator is movable relative to the housing only when the locking device is in the unlocked position;

wherein, when the locking device is in the locked position, the at least one compressible protrusion is disposed inside the at least one housing protrusion so as to preclude axial movement of the locking device relative to the housing along the longitudinal axis; and wherein, when the locking device is in the unlocked position, the housing compresses the at least one compressible protrusion, and the at least one compressible protrusion is disposed outside the at least one housing protrusion so as to allow axial movement of the locking device relative to the housing along the longitudinal axis.

16. The vehicle of claim 15, wherein the vehicle body includes a hinge pillar, and the housing is coupled to the hinge pillar.

17. The vehicle of claim 16, wherein the hinge pillar defines a pillar surface facing a passenger compartment of the vehicle, and the housing is disposed adjacent the pillar surface.

18. The vehicle of claim 15, wherein the at least one mechanical stop is in contact with the housing when the manual park release actuator is in the second position.

19. The vehicle of claim 15, wherein the at least one compressible protrusion is configured to gradually withdraw from the housing protrusion as the locking device rotates from the locked position to the unlocked position.

20. The vehicle of claim 19, further comprising a tether coupled to the locking device.

* * * * *